March 4, 1947.  E. F. SARVER  2,416,775
COOLED RADIATION THERMOCOUPLE
Filed April 20, 1942  2 Sheets-Sheet 1

INVENTOR
Emmett F. Sarver.
BY
Arthur C. Brown.
ATTORNEY

March 4, 1947. E. F. SARVER 2,416,775
COOLED RADIATION THERMOCOUPLE
Filed April 20, 1942 2 Sheets—Sheet 2
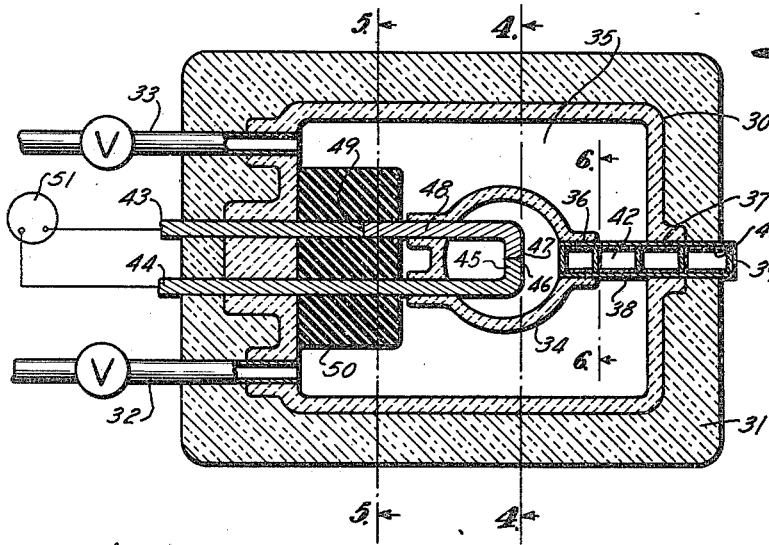
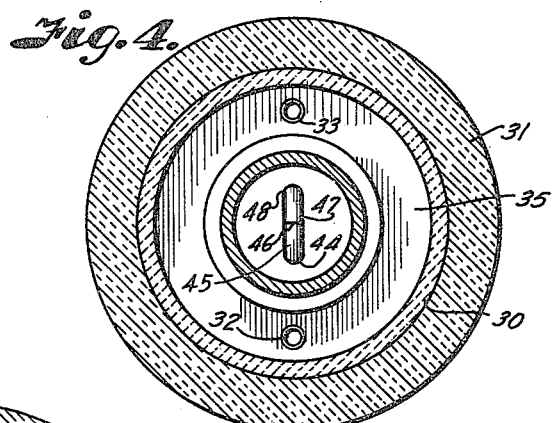
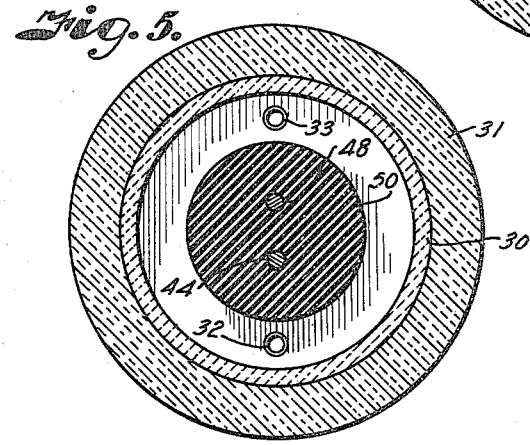
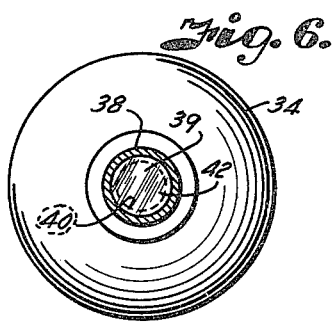
INVENTOR
Emmett F. Sarver.
BY
ATTORNEY Patented Mar. 4, 1947

2,416,775

UNITED STATES PATENT OFFICE 2,416,775

COOLED RADIATION THERMOCOUPLE

Emmett F. Sarver, Wichita, Kans., assignor of one-half to O. W. Wortman, Wichita, Kans.

Application April 20, 1942, Serial No. 439,736

3 Claims. (Cl. 136—4)

This invention relates to thermoelectric devices and has for its principal object to provide a device of this character having extreme sensitivity and capable of registering temperature of radiant heat or light rays in the visible spectrum.

Other objects of the invention are to provide a thermoelectric device of this character that is of simple construction; and to provide for maintenance of the electrocouple elements of the device at a substantially lower temperature than that of the radiant heat to be measured.

In accomplishing these and other objects of the invention, hereinafter described, I have provided improved structure, the preferred form of which is illustrated in the accompanying drawings, wherein:

Fig. 3 is a section through a modified form of the invention.

Fig. 4 is a cross-section on the line 4—4, Fig. 3.

Fig. 5 is a cross-section on the line 5—5, Fig. 3.

Fig. 6 is a cross-section on the line 6—6, Fig. 3.

Figure 1:
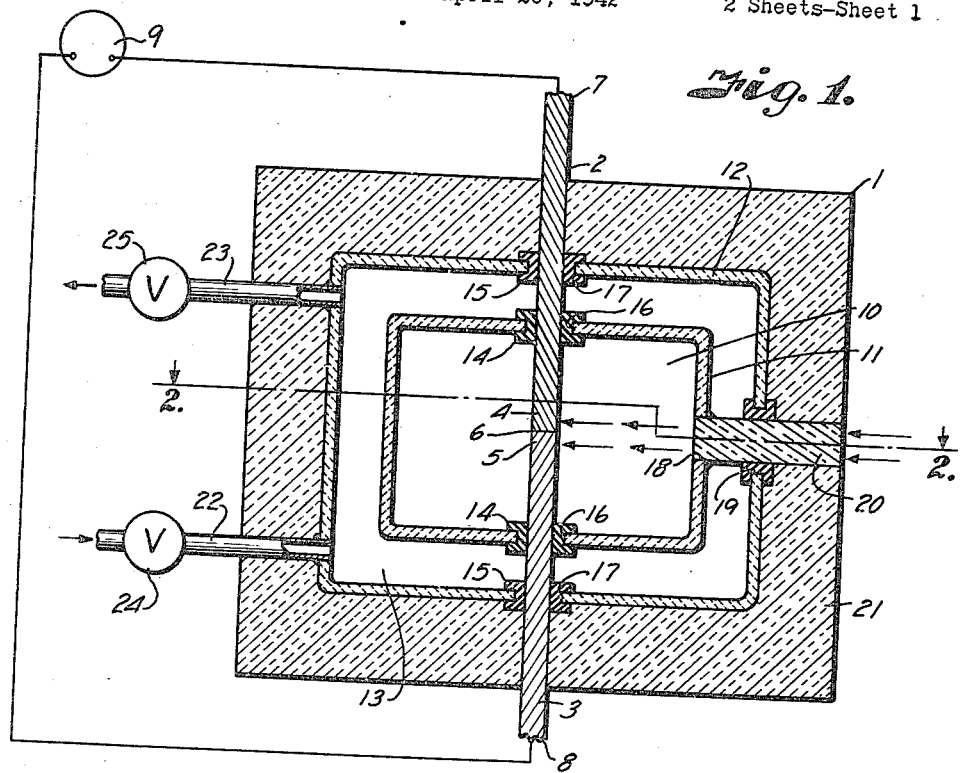
Fig. 1 is a section through a thermoelectric coupler constructed in accordance with the present invention, and taken on the line 1—1, Fig. 2.
Figure 2:
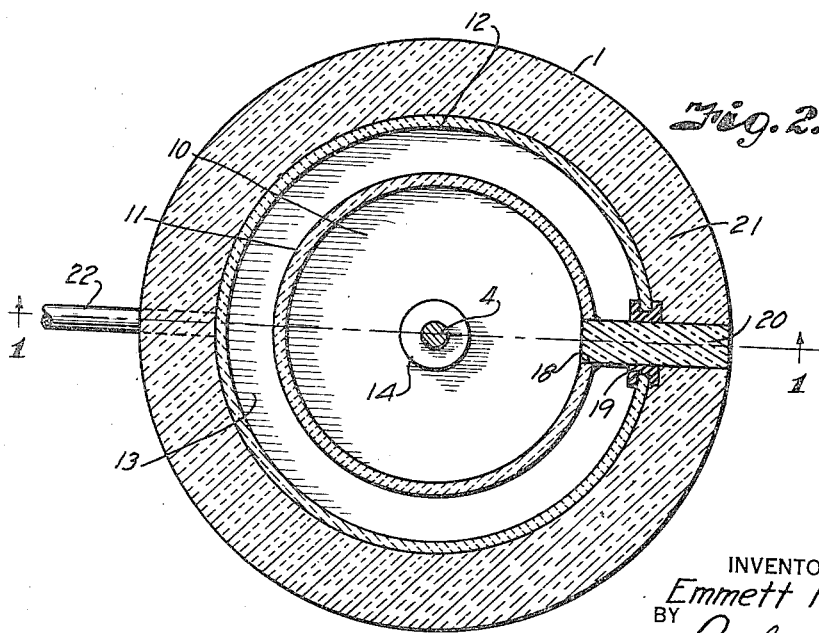
Fig. 2 is a section through the thermoelectric coupler on the line 2—2, Fig. 1.

Referring more in detail to the drawings:

1 designates a thermoelectric device embodying the features of the present invention and which includes thermoelectrically dissimilar conductors 2 and 3 formed of different materials capable of conducting an electric current, for example, iron and copper, and having ends 4 and 5 thereof connected in abutting relation to form an electrical connection 6 therebetween. The opposite ends 7 and 8 of the conductors are connected in a manner that current flowing therethrough incidental to difference in potential effected by different temperature of the respective connections, actuates a registering device 9 as in an ordinary thermocouple, that is when the junction 6 is subjected to varying temperatures a corresponding change occurs in the reading of the registering device so that the apparatus may be used as a thermometer.

I have found that sensitivity of such a device may be increased by maintaining temperature of the couple or junction 6 below the temperature to be measured. This is because radiant heat flows from a warmer to colder body and therefore the radiant heat from any body may be detected and the amount determined by directing rays from that body onto the junction 6, if the junction is maintained at a lower temperature than the rays to be measured.

With this in mind, I provide for maintaining the junction 6 at as low a temperature as possible so that the differential between the body and the junction is great, and to permit detection of a small amount or even an infinitesimal amount of heat. Also the rays have a relatively large heating influence upon the junction and a correspondingly large variation in the thermoelectrical potential established in the conductors for influencing the register mechanism. For example, if the junction might be maintained at absolute zero any object not at absolute zero would throw off a measurable amount of radiant heat to the junction.

In carrying out the invention the united ends 4 and 5 of the conductors 2 and 3 are sealed within an inner chamber 10 having enclosing walls 11 formed of a material capable of withstanding differential interior and exterior pressures and conducting heat from the interior to the exterior thereof. For example, a glass or similar plastic having a low degree of expansion and contraction such as one of the various borosilicate glasses, known under the trade name of "Pyrex." The inner chamber 10 is enclosed within an outer chamber 12 having the walls thereof formed of a similar material and spaced from corresponding walls of the inner chamber to provide a passageway 13 completely therearound for recirculation of a refrigerating medium. The inner chamber is suitably supported within the outer chamber, for example by the conductors 2 and 3 which extend through insulators 14 and 15 engaged in registering openings 16 and 17 in opposite walls of the chambers so that the insulators form gas-tight joints with the walls and the conductors. Located in the walls of the chambers at right angles to the insulator openings and having the centers located in a plane passing through the junction 6, are openings 18 and 19 supporting a translucent material, for example, glass, crystal or the like, forming a window 20 for the passage of the radiant heat to be measured. The window 20 is sealed within the respective openings and projects sufficiently from the outer chamber to extend through a heat insulating material 21 that is preferably a nonconductor of electricity covering the exterior surfaces of the outer chamber, for example, glass wool.

The refrigerating medium is supplied to the outer chamber through a pipe 22 from a suitable source of supply and returned to the source through a pipe 23, both pipes being provided with valves 24 and 25 respectively for controlling flow of the refrigerating medium to and from the passageway 13 and thereby regulating the temperature of the inner chamber.

The type of refrigerating medium is dependent upon the use of the device. However, it is contemplated to employ a refrigerant capable of maintaining as low temperature as practicable, for example a liquid gas such as oxygen. It is also possible to use any one of the commercial refrigerants such as "Freon" or the like. The inner chamber 10 is evacuated of air in a suitable manner so that the heating effect of radiant rays acts directly upon the junction 6.

In using the apparatus, the refrigerant is admitted to the passageway 13 upon opening of the valve 24. The refrigerant boils within the passageway 13 to cause lowering temperature of the couple and the expanded refrigerant is discharged from the passageway under control of the valve 25, the temperature being maintained at a fixed constant through regulation of the valves. The radiant heat flows from the warmer body emitting the same to the colder junction 6 of the thermocoupler, influencing the temperature thereof and causing a corresponding change in the current potential which change is visibly registered by the device 9. It is to be understood that the apparatus must be adjusted so that the rays pass through the window 20 and fall upon the junction 6.

The device thus described may be used to detect radiant heat or even light waves of the spectrum.

The form of the invention illustrated in Figs. 3 to 6 inclusive includes a thermocouple wherein both hot and cold junctions are located within the refrigerant compartment. The refrigerant compartment comprises a housing 30 formed of glass or similar plastic having a low degree of expansion and contraction such as borosilicate glass known under the trade name "Pyrex." The refrigerant compartment is encased in a heat insulating material that is preferably a non-conductor of electricity, for example, glass wool 31 and has connection with refrigerant supply and return pipes 32 and 33 similar to the first described form of the invention. Located within the refrigerant compartment is an inner chamber or compartment 34 formed of material similar to the housing 30 on which is shown of spherical form and has the sides thereof spaced from the walls of the housing 30 to form a passageway 35 therearound for circulation of the refrigerating medium. The housing forming the inner chamber has an opening 36 therein registering with a similar opening 37 in the outer housing 30 to mount a tube 38 formed of a plastic or other suitable material having low heat conductivity. The housing 30 and the inner compartment 34 may be formed of any dielectric material having a low degree of expansion and contraction and which is capable of withstanding relatively low temperatures.

Located within the tube are a number of transparent partitions 39 of glass, crystal or the like, which are spaced apart by tubular spacers 40 to form dead air or vacuous spaces 42 therebetween to prevent frosting of the outermost partition. Extending through the wall of the casing opposite the tube 38 are conductors 43 and 44, which may be formed of copper. The conductor 44 extends across the space 35 and has its terminal 45 located within the inner casing and connecting, as at 46, with the terminal 47 of an extension 48 of the other conductor 43. The extension 48 is formed of a different conductive material, for example, iron, than the conductor 44 to provide a thermocouple wherein the connection 46 forms the hot junction and the connection 49 with the conductor 43 constitutes the cold junction of the thermocouple, the cold junction being located in the passageway between the inner compartment and the outer compartment so that it is within the influencing temperature zone of the refrigerant as shown in Fig. 3.

In order to stabilize temperature of the cold junction the portions of the conductors extending across the passageway between the inner and outer housings are encased with an insulating material 50 such as rubber so as to prevent momentary fluctuations in temperature of the refrigerant from reaching the connection 49. The conductors 43 and 44 are also interconnected with a registering device 51 similar to that illustrated in the first form of the invention.

The modified form of the invention is operated similar to that of the first form of the invention, but the junctions of the couple are normally maintained at the same temperature except for the heat reaching the junction 46 through the window.

What I claim and desire to secure by Letters Patent is:

1. In a device of the character described, an inner housing having walls forming a completely enclosed chamber, an outer casing having corresponding walls spaced from the walls of the inner chamber to provide an annular passageway therebetween, means for circulating a refrigerant through said passageway, a pair of electrical conductors having ends terminating respectively in said chamber and in said passageway, a dissimilar thermoelectrical conductor connecting said ends of the first-named conductors to form a junction in said chamber and a junction in the passageway, a body of insulating material encompassing the junction in the passageway for stabilizing temperature of said junction during momentary fluctuations in temperature of the refrigerant circulated through said passageway, and means for passing heat rays through walls of the housing to act upon the junction within said chamber.

2. In a device of the character described, an inner housing having walls forming a completely enclosed chamber, an outer casing having corresponding walls spaced from the walls of the inner chamber to provide an annular passageway therebetween, means for circulating a refrigerant through said passageway, a pair of electrical conductors having ends terminating respectively in said chamber and in said passageway, a dissimilar thermoelectrical conductor connecting said ends of the first-named conductors to form a junction in said chamber and a junction in the passageway, a body of insulating material encompassing the junction in the passageway for stabilizing temperature of said junction during momentary fluctuations in temperature of the refrigerant circulated through said passageway, a tube having ends sealed within openings of the housings in substantial registry with the junction in said chamber, and a plurality of transparent partitions extending transversely within the tube to pass heat rays and spaced apart for forming insulation spaces therebetween.

3. In a device of the character described, an inner housing having walls forming a completely enclosed chamber, an outer casing having corresponding walls spaced from the walls of the inner chamber to provide an annular passageway therebetween, means for circulating a refrigerant through said passageway, a pair of electrical conductors having ends terminating respectively in said chamber and in said passageway, a dissimilar thermoelectrical conductor connecting said ends of the first-named conductors to form a junction in said chamber and a junction in the passageway, a body of insulating material encompassing the junction in the passageway for stabilizing temperature of said junction during momentary fluctuations in temperature of the refrigerant circulated through said passageway, a tube having ends sealed within openings of the housings in substantial registry with the junction in said chamber, a plurality of transparent partitions extending transversely within the tube to pass heat rays and spaced apart for forming insulation spaces therebetween, and insulating means covering the outer housing.

EMMETT F. SARVER.

REFERENCES CITED

The following references are of record in the file of this patent:

UNITED STATES PATENTS

| Number | Name | Date |
| --- | --- | --- |
| 1,667,355 | Norton | Apr. 24, 1928 |
| 2,056,672 | Hogg et al. | Oct. 6, 1936 |
| 1,553,789 | Moeller | Sept. 15, 1925 |
| 2,151,928 | Mead | Mar. 28, 1939 |
| 1,294,688 | Machlet | Feb. 18, 1919 |
| 1,818,221 | Huber | Aug. 11, 1931 |
| 1,099,199 | Parker | June 9, 1914 |
| 880,272 | Bristol | Feb. 25, 1908 |
| 1,081,365 | Coblentz | Dec. 16, 1913 |
| 1,475,365 | Schueler et al. | Nov. 27, 1923 |
| 1,274,635 | Tschudy | Aug. 6, 1918 |

OTHER REFERENCES

G. E. Review, vol. 44, No. 2, page 133, Feb. 1941. Wheelco Catalog S2-3, effective July 15, 1941, page 12. Cartwright, C. H., Review of Scientific Instruments, vol. 4 (1933), pp. 382-4, page 383 relied on. Bristol Bulletin P1102, May 1942, page 1.

Procedures in Experimental Physic, 1942, pages 423-4. Trans. Am. Soc. Heating and Ventilating Engrs., vol. 33 (1932), pages 239, 240. Houghton et al., Trans. Am. Soc. Heating and Ventilating Engrs., vol. 33 (1932), pages 239, 240.